Sept. 27, 1938.        C. L. POST        2,131,482
CALENDAR
Filed March 25, 1936
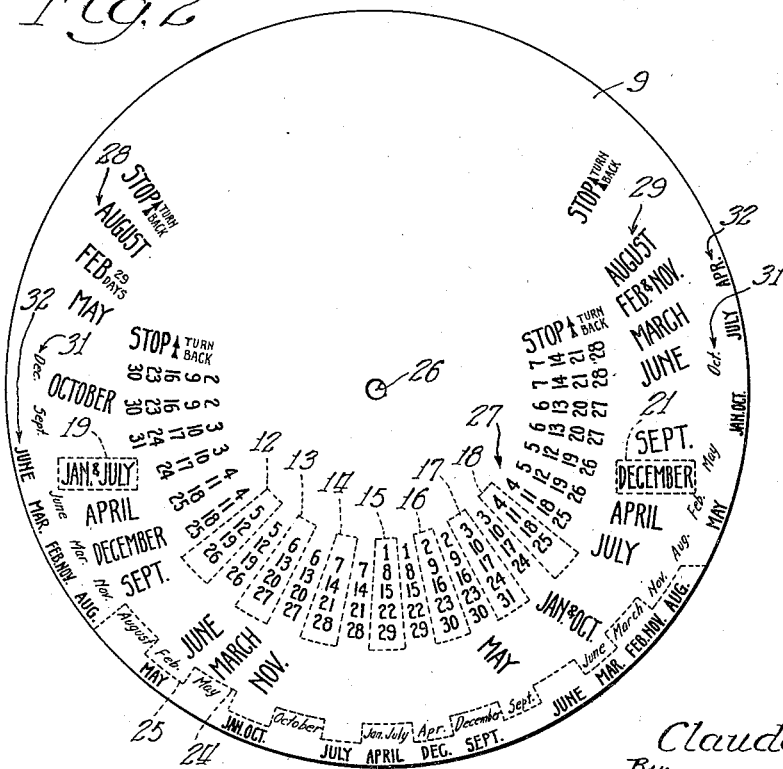
Inventor:
Claude L. Post
By: Hill & Hill
Attys.
Witness:
V. Silgander Patented Sept. 27, 1938

2,131,482

UNITED STATES PATENT OFFICE 2,131,482

CALENDAR

Claude L. Post, Chicago, Ill.

Application March 25, 1936, Serial No. 70,830

6 Claims. (Cl. 40—113)

This invention relates to calendars and particularly to a long term calendar.

A calendar of the present invention comprises, preferably, a plurality of members operatively related to each other in a manner whereby the chart or showing for any month in any year indicated on the calendar may be easily and quickly determined, and one of the objects of the present invention is to provide a calendar comprising the combination of a pair of members having suitable indicia thereon and which are relatively movable for the purpose of bringing the indicia on the respective members into proper operative relationship for obtaining the condition desired.

Another object of the invention is to provide a calendar of the character described in which a novel arrangement of indicia is provided on the front sides of the respective members in a manner whereby the results sought may be readily and conveniently obtained.

Another object of the invention is to provide a calendar in which the thirty and thirty-one day months are correctly given, including information by which the correct number of days for the month of February can be determined whether in a leap year or other year.

Another object of the invention is to provide a calendar in which the indicia provided thereon is arranged in a manner to insure proper relationship of the respective members, and wherein it is practically impossible to obtain an incorrect reading of the calendar when the members are properly adjusted with respect to each other.

A further object of the invention is to provide means by which one may be informed as to the limits to which one of the members is intended to be moved or otherwise shifted with respect to the other member in order to prevent improper positioning of one of the members with respect to the other member.

A still further object of the invention is to improve devices of the character described in sundry details hereinafter referred to and particularly pointed out in the appended claims.

One embodiment of the present invention is shown for illustrative purposes in the accompanying drawing in which:

Fig. 1 is a face view of a long term calendar comprising a pair of operatively related members embodying features of the present invention, a portion of the structure having been broken away to permit of showing the remainder of the structure on as large a scale as possible;

Fig. 2 is a face view, on a slightly reduced scale, of one of the members shown in Fig. 1 with the other member removed; and Fig. 3 is an elevational or edge view, partly in section, on a reduced scale of the structure illustrated in Fig. 1, a portion of Fig. 3 being shown in section to more clearly illustrate the manner of securing the respective members together and in operative relationship with respect to each other.

The illustrative embodiment of the invention, as shown in the drawing, comprises a pair of relatively movable members 8 and 9 shown, in the present instance, as operatively connected together in pivotal relationship by means of a ferrule or trunnion 11, and in a manner to permit of relative rotation of the members with respect to each other. For convenience in describing the present structure it might be helpful to observe here that the member 8 may be referred to as a relatively fixed or face member and the member 9 as a rotatable or subjacent member. With this observation in mind, the face member 8 may be described as formed of card-board or other suitable material and provided with a plurality of elongated radially extending annularly spaced apertures indicated respectively by the numerals 12 to 18, inclusive, and having indicia designating the days of the week, preferably, adjacent one end thereof.

Formed also in the member 8 are a plurality of apertures 19 and 21 disposed, preferably, at opposite sides of the pivotal center or trunnion 11 and having indicia designating a plurality of years, such as "1936" and "1937" associated therewith.

The member 8, preferably adjacent its lower edge portion, bears a plurality of radially disposed annularly spaced alternating relatively short and long columns or banks of indicia designating a plurality of years and indicated by the numerals 22 and 23, respectively, the short columns 22 shown in italic being leap years and the longer columns 23 being years other than the leap years, the long columns being also identified adjacent their upper end portions by the indicia numerals 1 to 7, respectively, The lower edge portion of the member 8, in the present instance, is shown as of substantially arcuate form and provided with a plurality of alternating recesses 24 and projections 25 arranged, respectively, adjacent the lower ends of and substantially in radial alignment with the relatively short and long columns of years 22 and 23.

Referring particularly to Fig. 2 of the drawing, it will be noted that the radially disposed apertures 12 to 18, inclusive, apertures 19 and 21 and the alternating recesses 24 and projections 25 are shown in dotted lines thereon, and that the rotatable or subjacent member 9 shown in Fig. 2 is provided with an aperture 26 adapted to receive the trunnion 11 in a manner to rotate thereon, and is provided with indicia comprising a plurality of numbers designating the days of the month and indicated as a whole by the numeral 27, the said indicia numbers being arranged in arcuate radially spaced lines and in radially extending annularly spaced columns with respect to the aperture 26, the numbers being successively or consecutively duplicated in the respective lines except the number 31, which appears but once in each of the two outermost arcuate lines, the said indicia numbers 27 being adapted to register with the apertures 12 to 18, respectively formed in the member 8 in a manner to appear as radially disposed annularly spaced columns under the respective days of the week appearing on the member 8 adjacent the upper end portion of the openings 12 to 18, respectively.

Adjacent the opposite ends of the lines of indicia numbers 27 are indicia reading "Stop! turn back" which, when brought into register with either the opening 12 or 18, will indicate that the member 9 has been moved too far to obtain a proper relationship of the indicia thereon, thereby providing means for indicating the limits to which the members 8 and 9 may be properly moved relative to each other.

Immediately outside the lines of indicia numbers 27 are a plurality of arcuate columns of indicia containing the months of the year and indicated by the numerals 28 and 29, the said columns being positioned, preferably, at opposite sides of the aperture 26, the months in the columns 28 and 29 being duplicated and adapted to register, respectively, with the openings 19 and 21 formed in the member 8 and designated by the indicia "1936" and "1937".

Adjacent the upper ends of the arcuate columns of months 28 and 29 are indicia reading "Stop! turn back" which, when brought into register with either of the openings 19 or 21, will indicate also that the member 9 has been moved too far to obtain a proper relationship of the indicia on the two members, thereby providing additional means for indicating the limits to which the members 8 and 9 may be properly moved relative to each other.

Outside the arcuate columns 28 and 29 are a plurality of radially spaced lines of months, indicated by the numerals 31 and 32, respectively, the months appearing in line 31 being duplicated except the months of January, April and July, and the months appearing in line 32 being duplicated except September and December, the months specifically named appearing but once in the respective last mentioned lines.

The months in line 31, it will be noted, appear in italics and are adapted to register with the respective recesses 24 formed in the lower edge portion of the member 8 in operative relationship with the relatively short columns of years 22 appearing also in italics on the member 8 adjacent the said recesses 24, the positioning of a month appearing in line 31 in register with a particular recess provides a proper relationship of the members 8 and 9 to designate the particular month in a leap year or years appearing in an adjacent column 22 in a manner to position the days of said month in that particular year or years in proper relationship with the openings 12 to 18, inclusive, formed in the member 8 to indicate the days of that particular month and year or years in proper relationship with the days of the week as defined by the openings 12 to 18, inclusive.

The months in line 32, it will be noted, appear in upper case letters and are adapted to register with the respective projections 25 formed on the lower edge portion of the member 8 in operative relationship with the relatively long columns of years 23 appearing on the member 8 adjacent said projections, the positioning of a month appearing in line 32 in register with a particular projection provides a proper relationship of the members 8 and 9 to designate the particular month in a year other than leap year appearing in an adjacent column 23 in a manner to position the days of said month in that particular year or years in proper relationship with the openings 12 to 18, inclusive, formed in the member 8 to indicate the days of that particular month and year or years in proper relationship with the days of the week as defined by the openings 12 to 18, inclusive.

In the operation of the device, the member 9 may be rotated so that any particular month appears under one of the columns of years 22 or 23 in which a date is desired, which will give that complete calendar month in that particular year. For example, for the first month of the year 1936, turn the member 9 so that the month of January appears in the opening 19 adjacent the indicia "1936", or so that the month of January in line 31 of the member 9 appears in the recess adjacent the column or bank of years 22 in which 1936 appears, and shown, in the present instance, as the short column between adjacent longer columns under the indicia "3" and "4". This will give the month of January, 1936, and in this same position, the calendar is set for July, 1936, and December, 1937 (see Fig. 1). By referring to the outer portion of the member 9, the months appearing thereon are correct for all the years in the columns of years which appear above said months. In the column designated by the indicia "1", the years 1850, 1861, and 1867 so on down to 1957 are shown, and on member 9, line 32, under this column appears "May". This gives the correct calendar month for May in all of these years, the month starting on Wednesday, and having thirty-one days. In the same position, the calendar is correct for January and October in all the years in column "2"; July in all the years in column "3" and so on to August in the years appearing in column "7". The leap years in the relatively short columns 22 are in italic figures as are also the months for the leap years appearing in line 31, and it will be apparent that by leaving the member 9 in the position above described, the month of August, for example, is shown directly under the first relatively short column 22 containing the years 1860, 1888, 1928 and 1956, in which the month of August in all of these leap years is shown as starting on Wednesday with the first of the month and ending with Friday, the 31st.

It will be observed from the foregoing description that the present invention provides a long term calendar on which suitable indicia and sight openings are arranged on the front sides of relatively movable members, whereby desired results may be obtained, and wherein the said members may be readily and conveniently positioned with respect to each other, whereby the calendar will properly show the days of the week and month for any month of any year indicated on the calendar.

Furthermore, it will be apparent that the present invention insures the positioning of the relatively movable members in proper relationship with respect to each other in a manner to obviate the possibility of obtaining an incorrect reading of the columns when the members are properly adjusted with respect to each other.

Obviously, the present invention is not limited to the precise construction and arrangement shown and described, except as the same may be limited by the appended claims. Moreover, all the features of the invention need not be used conjointly, as the same may be used to advantage in variously different combinations and subcombinations.

What I claim as new and desire to secure by Letters Patent is:

1. A calendar comprising a face member and a subjacent member operatively related and relatively movable with respect to each other, said face member having sight openings therein and bearing the days of the week on the front side thereof adjacent the respective openings and also bearing a plurality of columns of years on the front side of said face member adjacent an edge portion thereof, indicating means on said face member for designating certain of said columns, said subjacent member bearing the days of the month on the front side thereof adapted to register with the respective sight openings in said face member, said subjacent member having an exposed portion bearing the months of the year on the front side thereof and extending beyond said edge portion of the face member to expose said months adjacent the portion of said face member bearing said columns of years, the months of the year on said exposed portion of the subjacent member being adapted to be positioned in operative relationship with respective columns of years on the face member adjacent said edge thereof.

2. A calendar comprising a face member and a subjacent member operatively related and relatively movable with respect to each other, said face member having sight openings therein and bearing the days of the week on the front side thereof adjacent certain of said openings, and bearing a year or years on the front side of said face member adjacent other of said openings and also bearing a plurality of columns of years on the front side of said face member adjacent a side edge portion thereof, indicating means on said face member associated with said columns, said subjacent member bearing the months of the year and the days of the month on the front side thereof adapted to register with the respective sight openings in said face member associated with the year or years and the days of the week on said face member, said subjacent member having an exposed edge portion bearing the months of the year on the front side thereof and extending beyond said edge portion of the face member to expose said last mentioned months adjacent the portion of said face member bearing said columns of years, the months of the year on said exposed edge portion of the subjacent member being adapted to be positioned in operative relationship with the respective columns of years on the face member adjacent said edge portion thereof.

3. A calendar comprising a pair of operatively related movable members, one of said members having a plurality of laterally spaced openings formed therein and bearing the days of the week on the front side of said member adjacent the respective openings, said member also bearing on the front side thereof a plurality of laterally spaced columns of leap years and other years and having recesses and projections formed on said member for indicating the respective columns of leap years and other years, the other of said members bearing the days of the month arranged in lines adapted to register with said openings and bearing a plurality of lines of months operatively related to said columns of years on said first-mentioned member.

4. A calendar comprising a pair of pivotally related members, one of said members having a plurality of radially extending arcuately spaced openings formed therein and bearing the days of the week on the front side of the member adjacent the respective openings, said member also bearing on the front side thereof a plurality of radially extending arcuately spaced columns of leap years and other years arranged alternately with respect to each other, said member having alternating means formed thereon for indicating the respective columns of leap years and other years, the other of said members bearing the days of the month arranged in radially spaced arcuate lines adapted to register with said openings and bearing a plurality of radially spaced arcuate lines of months operatively related to said columns of years on said first-mentioned member.

5. A calendar comprising a pair of pivotally related members, one of said members having a plurality of radially extending arcuately spaced openings formed therein and bearing the days of the week on the front side of the member adjacent the respective openings, said member also bearing on the front side thereof a plurality of radially extending arcuately spaced columns of leap years and other years arranged alternately with respect to each other, said member having alternating recesses and projections formed adjacent its edge portion and adjacent said columns for indicating respectively the columns of leap years and other years on said member, the other of said members bearing the days of the month arranged in radially spaced arcuate lines adapted to register with said openings and bearing a plurality of radially spaced arcuate lines of months adjacent the edge of said last mentioned member, the months of said lines being adapted to be positioned adjacent the respective recesses and projections on said first mentioned member.

6. A calendar comprising a relatively fixed member and a rotatable member pivotally mounted thereon, said fixed member having a plurality of elongated radially extending arcuately spaced openings formed therein and bearing the days of the week on the front side of said member adjacent the respective openings, said fixed member also bearing on the front side thereof a plurality of radially extending arcuately spaced columns of leap years and other years arranged alternately with respect to each other, said member having alternating recesses and projections formed adjacent its edge portion and, respectively, adjacent said columns for indicating the respective columns of leap years and other years on said member, said rotatable member bearing the days of the month arranged in radially spaced arcuate lines and annularly spaced columns adapted to register with said openings and to appear therethrough as annularly spaced radially disposed columns under the days of the week adjacent the respective openings, said rotatable member also bearing a plurality of radially spaced arcuate lines of months adjacent the edge thereof, the months in the innermost of said lines being adapted to register, respectively, with the recesses formed in said fixed member and the months in the outermost of said lines being adapted to be positioned adjacent the projections formed on said fixed member, all in operative relation with respect to the years in the columns associated with the respective recesses and projections.

CLAUDE L. POST.